US00RE35175E

United States Patent [19]

Yamaguchi

[11] E Patent Number: Re. 35,175

[45] Reissued Date of Patent: Mar. 12, 1996

[54] TAPE PRINTING DEVICE HAVING TAPE CUT POSITION REGULATOR

[75] Inventor: Koshiro Yamaguchi, Kasugai, Japan

[73] Assignee: Brother Kogyo Kabushiki Kaisha, Aichi, Japan

[21] Appl. No.: 278,078

[22] Filed: Jul. 20, 1994

Related U.S. Patent Documents

Reissue of:

[64] Patent No.: 5,131,772
Issued: Jul. 21, 1992
Appl. No.: 757,010
Filed: Sep. 9, 1991

[30] Foreign Application Priority Data

Sep. 12, 1990 [JP] Japan ..... 2-242259

[51] Int. Cl.[6] ..... B41J 11/26

[52] U.S. Cl. ..... 400/621; 346/24; 400/120.01; 400/61; 400/76; 83/211; 226/143

[58] Field of Search ..... 400/621, 582, 400/583, 120.01, 61, 76; 346/24, 136, 76 PH; 358/305; 83/436, 437, 733, 734, 211; 226/143; 101/227, 233

[56] References Cited

U.S. PATENT DOCUMENTS

| | | | |
|---|---|---|---|
| 3,791,293 | 2/1974 | Rastorguyeff et al. | 101/292 |
| 3,951,061 | 4/1976 | Bremmer, Jr. et al. | 101/227 |
| 4,253,774 | 3/1981 | Hanakata et al. . | |
| 4,310,859 | 1/1982 | Takahashi et al. . | |
| 4,604,632 | 8/1986 | Matsumoto . | |
| 4,663,638 | 5/1987 | Hirose . | |
| 4,752,786 | 6/1988 | Inoue et al. . | |
| 4,925,325 | 5/1990 | Niikiwa . | |
| 4,926,191 | 5/1990 | Takenaka et al. . | |
| 4,927,278 | 5/1990 | Kuzuya et al. . | |
| 4,941,377 | 7/1990 | Ishihara et al. . | |
| 4,957,381 | 9/1990 | Sagai et al. . | |
| 4,968,165 | 11/1990 | Karube et al. . | |
| 4,976,558 | 11/1990 | Kuzuya et al. | 400/641 |
| 5,041,845 | 8/1991 | Ohkubo et al. . | |
| 5,062,722 | 11/1991 | Shiozaki et al. . | |
| 5,066,152 | 11/1991 | Kuzuya et al. | 400/621 |
| 5,071,274 | 12/1991 | Niikawa . | |
| 5,159,350 | 10/1992 | Minaminaka | 400/621 |
| 5,222,818 | 6/1993 | Akiyama | 400/61 |

FOREIGN PATENT DOCUMENTS

| | | |
|---|---|---|
| 0319209 | 6/1989 | European Pat. Off. . |
| 0429873A2 | 6/1991 | European Pat. Off. . |
| 59-022786 | 2/1984 | Japan . |
| 60-115481 | 6/1985 | Japan . |
| 61-143163 | 6/1986 | Japan . |
| 63-205264 | 8/1988 | Japan . |
| 1-104359 | 7/1989 | Japan . |
| 2-56666 | 4/1990 | Japan . |
| 2-56663 | 4/1990 | Japan . |

*Primary Examiner*—Eugene H. Eickholt
*Attorney, Agent, or Firm*—Oliff & Berridge

[57] ABSTRACT

A tape printing device for printing characters on an elongated tape-like print medium and for cutting the print medium at a desired leading and trailing cutoff end positions. The device includes a tape feed mechanism for feeding an elongated tape-like print medium, printing means for printing the tape-like print medium, and tape cutting means positioned downstream of the printing means with respect to a tape feeding direction for cutting the tape-like print medium. The tape cutting means provides a predetermined tape cutoff execution position at which the tape-like print medium is subjected to cutting. The device is characterized by cutoff position data inputting means for inputting cutoff positions spaced from a leading end and trailing end printed position for obtaining an intended top and bottom marginal lengths, and tape feed controlling means for controlling the tape feed mechanism to feed the tape-like print medium based on the input cutoff position data so that the input cutoff position will reach the tape cutoff execution position.

31 Claims, 5 Drawing Sheets

TAPE PRINTING DEVICE HAVING TAPE CUT POSITION REGULATOR

Matter enclosed in heavy brackets [ ] appears in the original patent but forms no part of this reissue specification; matter printed in italics indicates the additions made by reissue.

BACKGROUND OF THE INVENTION

The present invention relates to a tape printing device for printing characters on an elongated tape and laminating the print image surface with another tape. More particularly, the invention relates to such tape printing device provided with a tape cut position regulating arrangement in association with first character position and last character position on the tape.

Heretofore, a tape printing device is adapted to provide printed character image in an elongated label tape. That is, the label tape includes a tape like print medium or an elongated adhesive tape on which the printed character image is printed, and a transparent tape which covers the printed image surface of the adhesive tape. A conventional tape printing device generally includes a tape feed mechanism for feeding the tape-like print medium, and printing means for printing the tape-like print medium. The tape printing devices also includes an arrangement having a tape cutter for cutting off the tape-like print medium at a predetermined tape cutoff execution position. The tape-like print medium is cut off by severing a marginal leading end or trailing end portion of the printed area off from the elongate tape, thus producing a piece of printed label tape. The tape-like print medium is cut off before or after it is printed. Such arrangement is disclosed in a commonly assigned U.S. Pat. No. 4,927,278.

The tape cut-off execution position where the tape-like print medium is actually cut off is a fixed position spaced a certain distance from the printing means because of structural requirements for the tape cutter or the like. Therefore, it has been customary for the tape-like print medium to have cutoff and printed ends that are spaced a constant distance from each other at all times.

Since the distance between the cutoff and printed ends of the tape-like print medium is fixed, however, an end of a piece of label tape which is produced may have to be further cut off with scissors or the like, depending on the position or application in which the label tape is applied. Thus, top or bottom margin space has to be again adjusted with resect to the cut label tape, which may be troublesome and time consuming.

SUMMARY OF THE INVENTION

In view of the above problem, it is an object of the present invention to provide a tape printing device which can cut off a tape-like print medium at a desired position, thus reducing the number of steps of processing a tape end.

This and other object of the present invention will be attained by providing a tape printing device including a tape feed mechanism for feeding an elongated tape-like print medium in a tape feeding direction; printing means for printing the tape-like print medium, the printing means providing a print start position; tape cutting means positioned downstream of the printing means with respect to the feeding direction for cutting the tape-like print medium, the tape cutting means providing a predetermined tape cutoff execution position at which the tape-like print medium is subjected to cutting, the improvement comprising: (a) cutoff position data inputting means for inputting a cutoff position with respect to a position in which the tape-like print medium is printed; and (b) tape feed controlling means for controlling the tape feed mechanism to feed the tape-like print medium based on the input cutoff position data so that the input cutoff position will reach the tape cutoff execution position.

With the tape printing device according to the present invention, the tape-like print medium can be cut off by a tape cutter when a desired cutoff position on the tape-like print medium reaches a predetermined tape cutoff execution position. As a result, the tape printing device reduces the number of steps of processing the ends of the tape-like print medium.

DETAILED DESCRIPTION OF THE PREFERRED EMBODIMENTS

A tape printing device according to one embodiment of the present invention will be described with reference to drawings.

Figure 2:
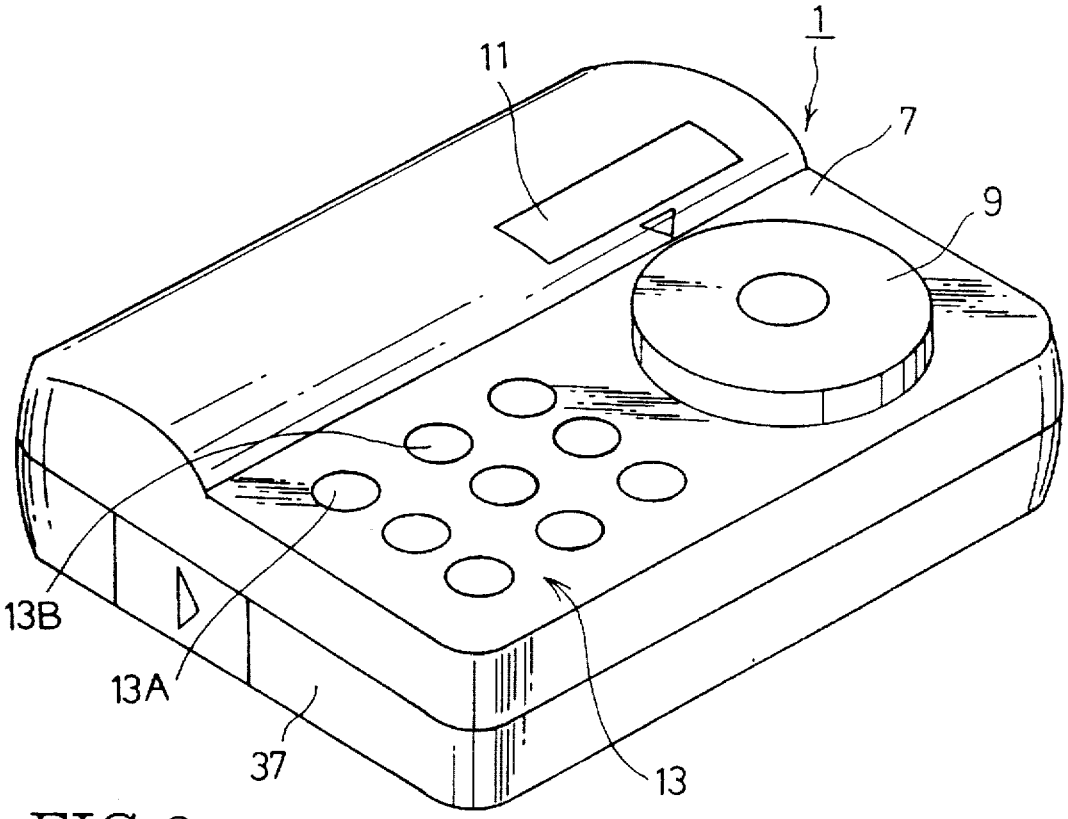
FIG. 2 is a perspective view showing the tape printing device according to an embodiment of the present invention.

As shown in FIG. 2, the tape printing device 1 has a housing 7, a character selector dial 9, a liquid-crystal display (hereinafter referred to as an "LCD") 11, and a function key pad 13. The housing 7 accommodates therein a printing mechanism 3, a tape cassette 5, as shown in FIG. 3, and an electronic controller 15 shown in FIG. 4.

The tape cassette 5 has a cassette case 17, a transparent tape roll 19, an ink ribbon roll 21, and an adhesive tape roll 23. The transparent tape roll 19 comprises a transparent tape 19A wound thereon, and the ink ribbon roll 21 comprises an ink ribbon 21A wound thereon. The adhesive tape roll 23 comprises an adhesive tape 23A wound thereon. As shown in FIG. 3, the tapes 19A, 21A, 23A are fed in the cassette case 17, and after having been printed by the printing mechanism 3, they are combined into a label tape 25 which is then discharged out of the tape cassette 5.

Figure 3:
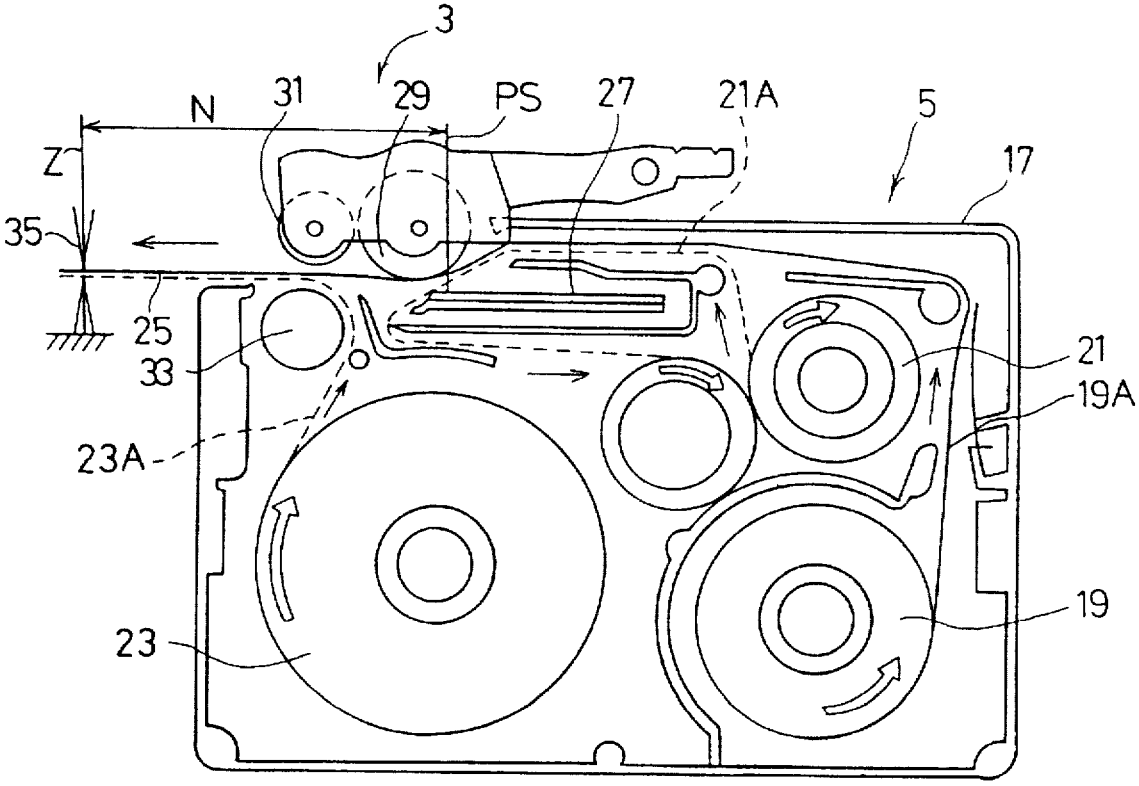
FIG. 3 is a view of a printing mechanism and a tape cassette of the tape printing device according to the embodiment of this invention.

As illustrated in FIG. 3, the printing mechanism 3 includes a thermal head 27, a platen 29, a tape feed roller 31, and an auxiliary roller 33. The printing mechanism 31 bonds the transparent tape 19A and the adhesive tape 23A to each other with the tape feed roller 31 and the auxiliary roller 33 to provide a label tape 25 and feeds the label tape 25. The transparent tape 19A and the ink ribbon 21A are pressed against the thermal head 27 by the platen 29, and at the same time the thermal head 27 is energized to thermally fuse and transfer an ink from the ink ribbon 21A to the transparent tape 19A.

As shown in FIG. 3, a tape cutter 35 for cutting off the label tape 25 at a tape cutoff execution position is disposed in the vicinity of a region where the label tape 25 is discharged from the tape cassette 5. The tape cutter 35 is actuated when a lever 37 (FIG. 2) is manually operated on.

Figure 4:
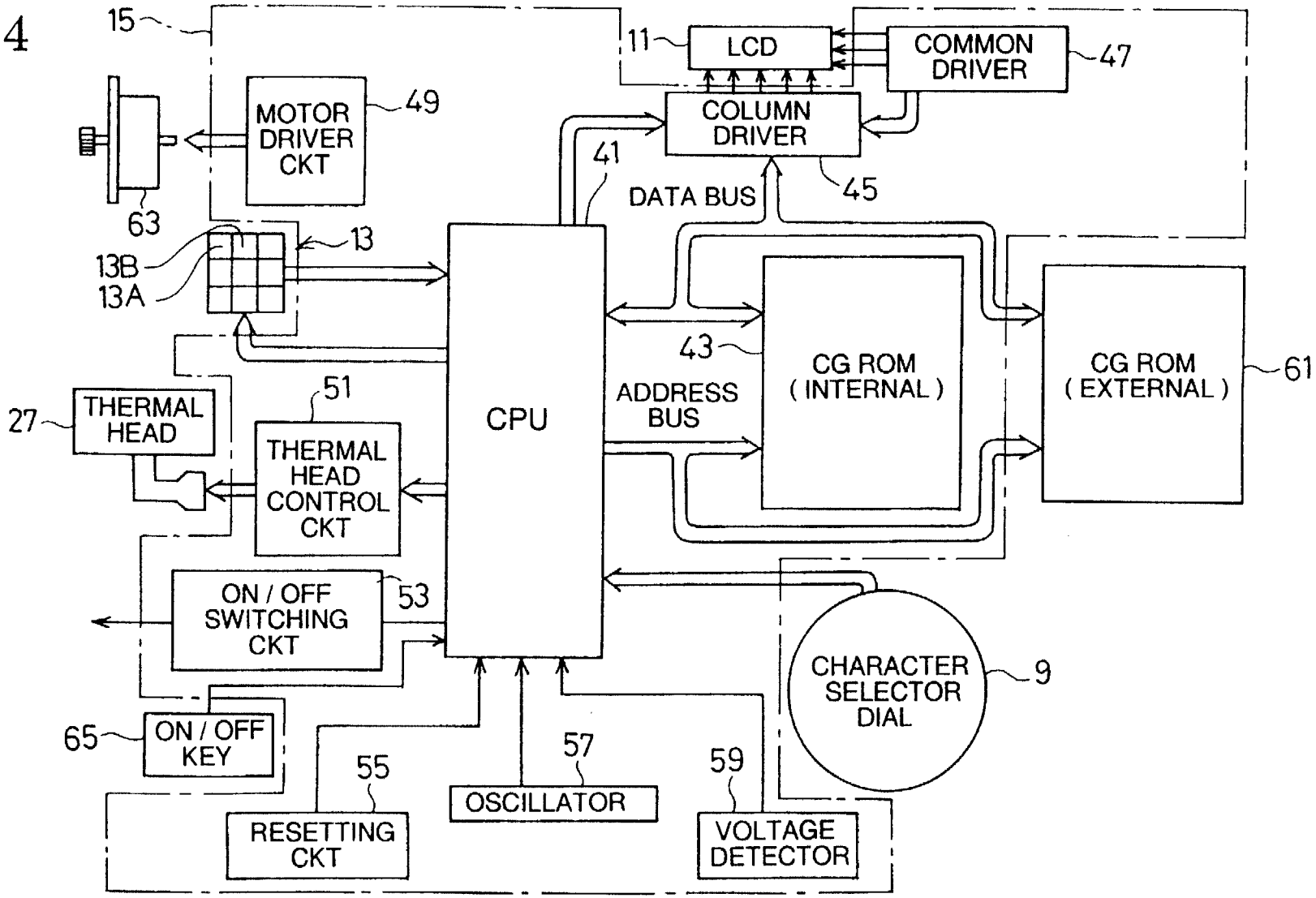
FIG. 4 is a block diagram showing an electronic controller of the tape printing device according to the one embodiment of this invention.

As shown in FIG. 4, the electronic controller 15 includes a CPU 41, a CG ROM 43, a column driver 45, a common driver 47, a motor driver circuit 49, a thermal head control circuit 51, an ON/OFF switching circuit 53, a resetting circuit 55, an oscillator 57, and a voltage detector 59. Further, to the electronic controller 15, there are connected a CG ROM 61, a pulse motor 63, an ON/OFF key 65, the character selector dial 9, the LCD 11, and the function key pad 13.

The column driver 45 and the common driver 47 energize the LCD 11 to display given information based on display data transmitted from the CPU 41. CG ROM 43 serves as a character generator in the electronic controller 15, and the CG ROM 61 serves as an add-on character generator connected to the electronic controller 15. The character selector dial 9 serves to input desired character data into the electronic controller 15, i.e., into the CPU 41. The pulse motor 63 rotates the tape feed roller 31. The motor driver circuit 49 energizes the pulse motor 63 based on a signal from the CPU 41. The thermal head control circuit 51 energizes the thermal head 27. The ON/OFF key 65 is used to turn on or off the power supply of the tape printing device. The function key pad 13 is used to input characters, effect printing, and select a tape cutoff position. The function key pad 13 includes a print key 3A and a confirm/execute key 13B.

Figure 1:
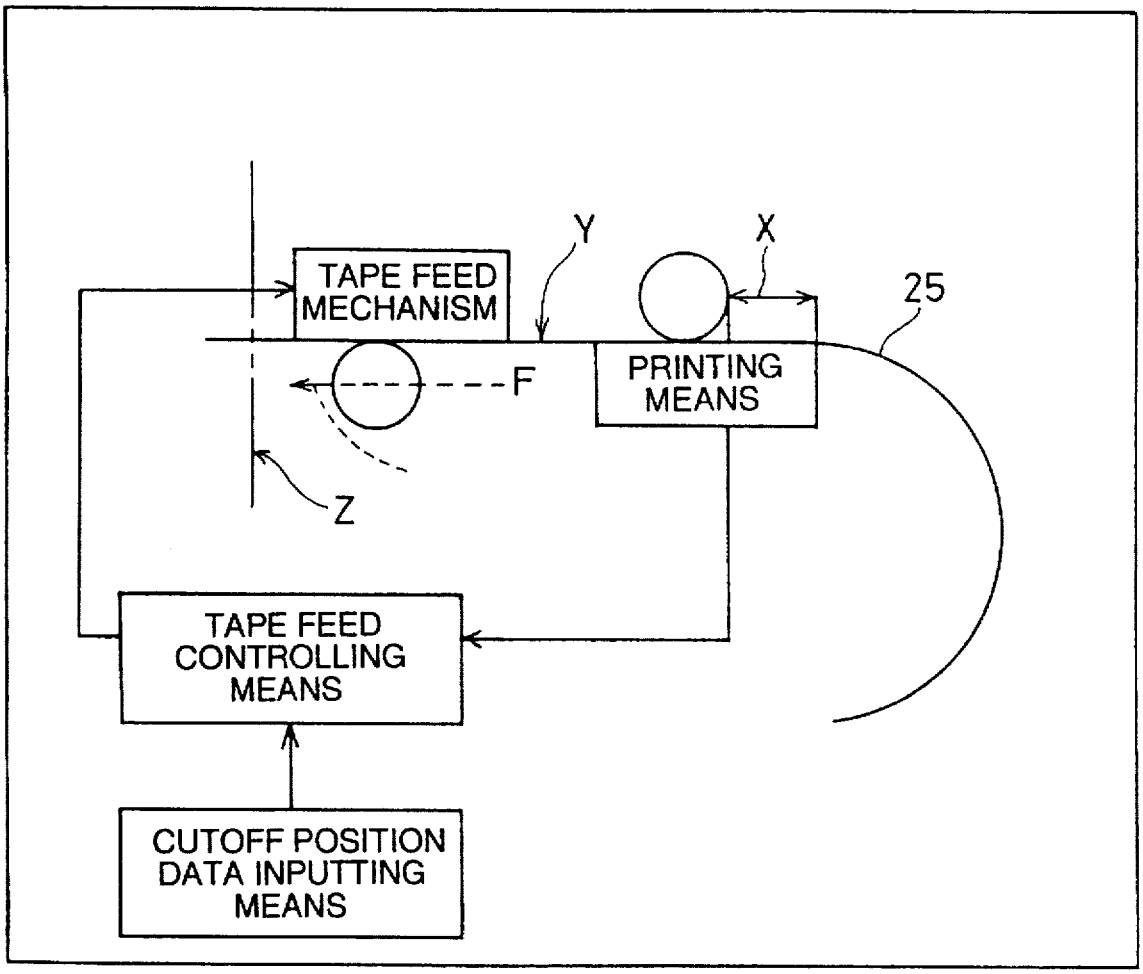
FIG. 1 is a diagram showing, by way of example, a basic arrangement of a tape printing device according to the present invention.

FIG. 1 briefly delineates a basic arrangement for providing an intended top and bottom marginal length of the label tape. The tape printing device 1 is provided with the tape feed mechanism (the tape feed roller 31, the auxiliary roller 33 and the pulse motor 63) for feeding a tape-like print medium (label tape 25), and printing means (thermal head 27 and the platen 29) for printing the tape-like print medium. The tape-like print medium is cut off at a predetermined tape cutoff execution position (tape cutter 35 position). The tape printing device further includes cutoff position inputting means (LCD 11, character selector dial 9, the function keys 13) for inputting a cutoff position with respect to a position in which the tape-like print medium is printed, and tape feeding means (CPU 41, the motor driver circuit 49) for controlling the tape feed mechanism to feed the tape-like print medium based on the input cutoff position so that the input cutoff position will reach the tape cutoff execution position. Incidentally, in FIG. 1 X, Y, Z designate an actual printing position, intended tape cutting position, and the tape cutoff execution position, respectively. Further, the label tape 25 is fed in a direction indicated by an arrow F.

First, the cutoff position inputting means inputs a cutoff position with respect to the position in which the tape-like print medium is printed by the printing means. Then the tape feeding means controls the tape feed mechanism to feed the tape-like print medium so that the input cutoff position will reach the tape cutoff execution position. For example, the tape feed mechanism feeds the tape-like print medium until a desired cutoff position, which is spaced forwardly a desired distance from a leading end of an area to be printed by the printing means, reaches the tape cutoff execution position. Then, after the tape-like print medium has been printed while it is being fed along, the tape feed mechanism feeds the tape-like print medium until a desired cutoff position, which is spaced rearwardly a desired distance from a trailing end of the area printed by the printing means, reaches the tape cutoff execution position. Therefore, by cutting off the tape-like print medium when the tape cutoff position reaches the tape cutoff execution position, a label tape is produced which has been processed to have a tape end of desired length.

Figure 5:
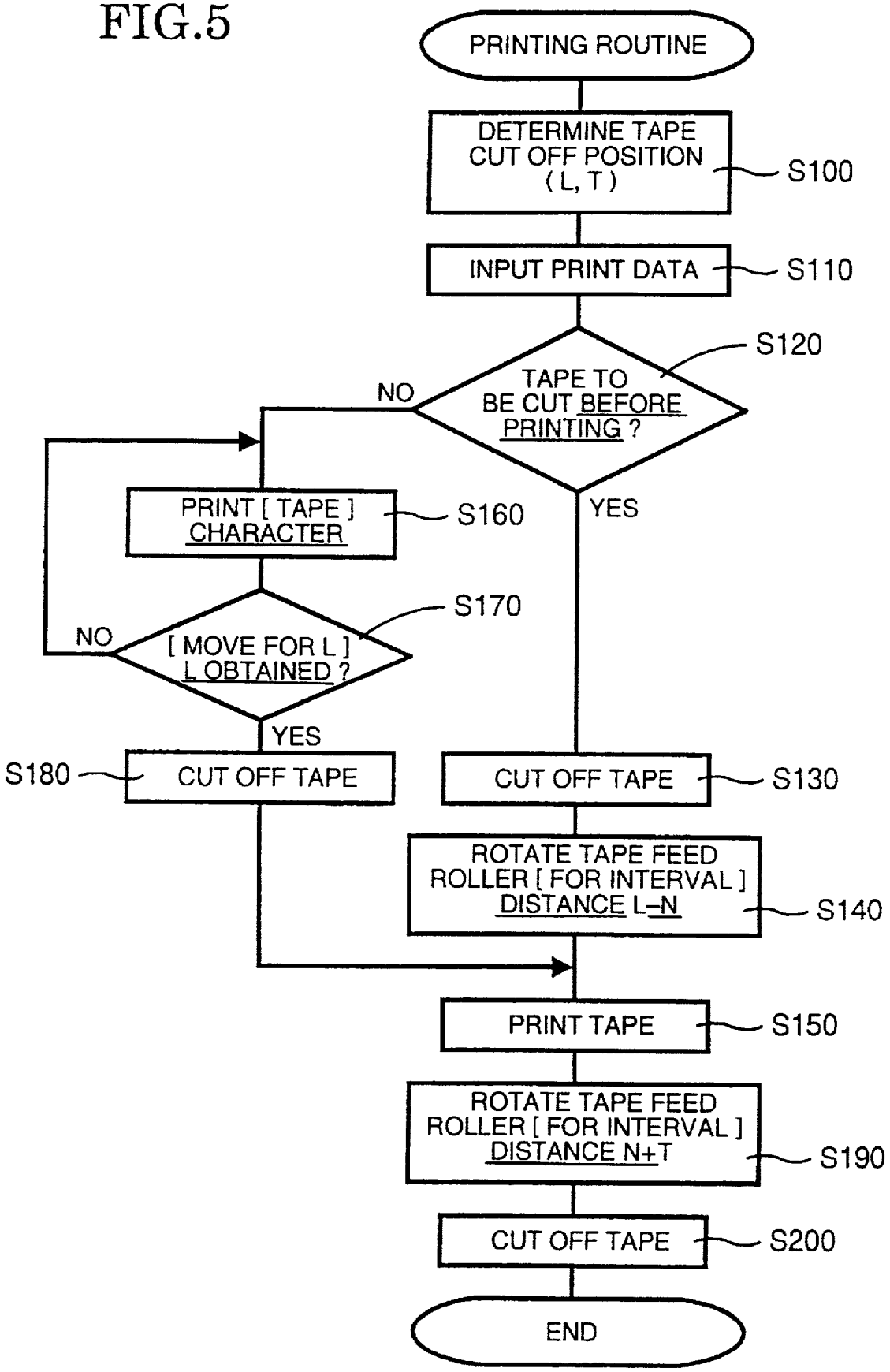
FIG. 5 is a flowchart of a printing routine according to the embodiment of this invention.
Figure 6:
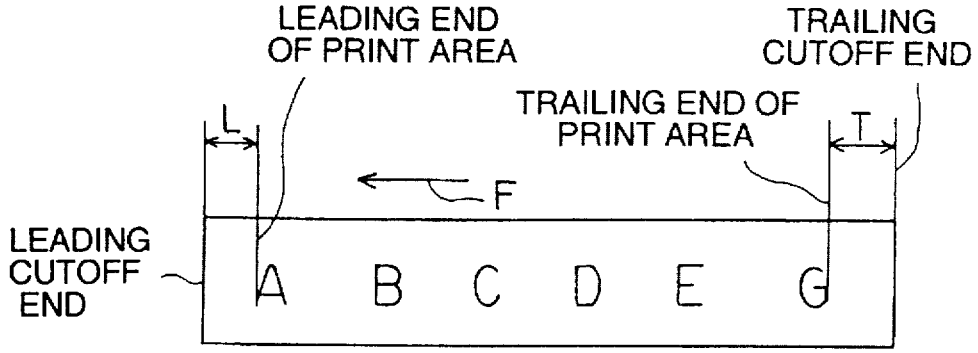
FIGS. 6 is a view showing a completely printed and cut label tape fed in a direction indicated by an arrow and having top or leading margin length L and bottom or trailing margin length T.
Figure 7:
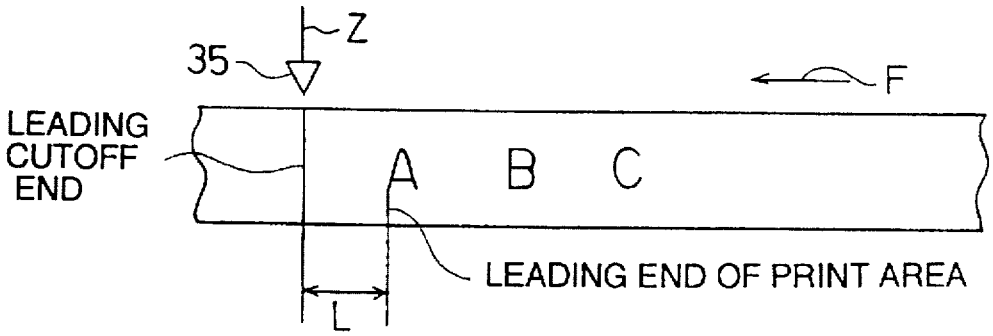
FIG. 7 is a view for description of a front cutting position of the label tape with respect to a first character with obtaining the top marginal length L.
Figure 8:
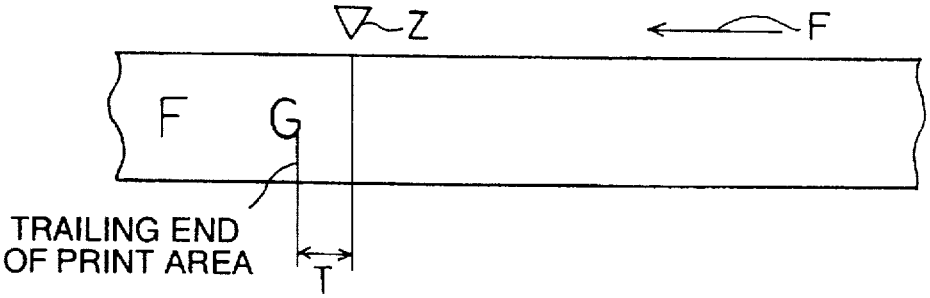
FIG. 8 is a view for description of a rear cutting position of the label tape with respect to a last character for obtaining the bottom marginal length T.

Detailed operation mode will now be described below. FIG. 5 is a flowchart of a printing routine, and FIGS. 6 through 8 are views illustrative of a tape cutoff position. The printing routine shown in FIG. 5 is initiated when the print key 13A is pressed after the power supply is turned on by the ON/OFF key 65.

According to the printing routine, a tape cutoff position (L, T) is first determined in Step S100. The tape cutoff position is determined by first displaying on the LCD 11 a prompt to request the operator to input a leading cutoff length L, and then entering, from the operator, the numerical value of the desired leading cutoff length L through the character selector dial 9. The leading cutoff length L is the distance between a leading end of a printed area and a leading cutoff end, as shown in FIG. 6. After the front leading cutoff length L is entered, the LCD 11 displays a prompt to request the operator to input a trailing cutoff length T, and then the operator enters the numerical value of the desire trailing cutoff length T through the character selector dial 9. The trailing cutoff length T is the distance between a trailing end of the printed area and a trailing cutoff end, as shown in FIG. 6. The input leading and trailing cutoff lengths L, T are stored in a memory in the CPU 41.

Then, print data are entered in Step S110. More specifically, the LCD displays a prompt to request the operator to input print data, and the CPU 41 stores character data entered by the operator. For example, character data "ABCDEFG" as shown in FIG. 6 are sent to the CPU 41 through the character selector dial 9, and stored in the memory in the CPU 41.

After the print data have been entered, Step S120 determines whether the tape is to be cut off or not. Specifically, the step S120 determines whether the leading cutoff length L is greater than a constant N or not. The constant N represents the value of a distance between a printing start position PS where the printing to the tape is started by the thermal head 27, and the tape cutoff execution position (a blade position of the tape cutter 35).

If the tape is to be cut off, i.e., if the inputted leading cutoff length L is greater than the constant N, then the tape is cut off in Step S130. More specifically, the CPU 41 controls the LCD 11 to display a prompt to request the operator to cut off the tape. The operator operates on the lever 37 to cause the tape cutter 35 to cut off the label tape 25 at the tape cutoff execution position, as shown in FIG. 7.

After the tape has been cut off, the tape feed roller 31 is rotated for the interval L in Step S140. Specifically, when the confirm/execute key 13B is pressed, the pulse motor 63 is energized to feed the label tape 25 for an interval corresponding to a value which is produced by subtracting the constant N from leading cutoff length L.

After the tape has been fed, it is printed in Step S150. The tape is printed by outputting the character data, which have been entered in the Step S110, to the thermal head 27 in synchronism with the feeding of the label tape 25. Thus, the label tape 25 starts being printed at a position that is spaced the distance L from the leading cutoff end as shown in FIG. 7, and is printed until the characters as shown in FIG. 6 are formed on the tape.

Figure 9A:
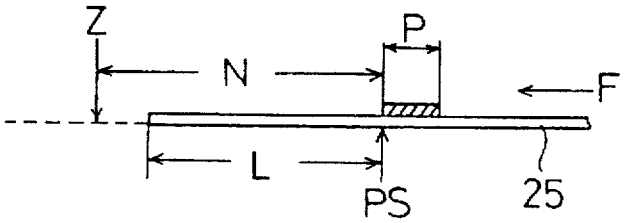
FIGS. 9(a) and 9(b) are views for description of providing the top marginal length L which is smaller than a distance N between an tape cutting position and a printing start position.
Figure 9B:
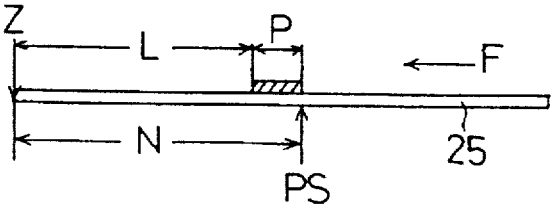

On the other hand, if the tape is not to be cut off in the Step S120 (if the intended top marginal distance L is smaller than the constant N as shown in FIG. 9(a)), the routine goes into Step 160, i.e., it is first printed in Step S160. That is, a single character is printed based on the character data entered in the Step S110. After the one character has been printed, Step S170 determines whether the tape has been moved to provide the intended top margin having the length L. Assuming that the one character printing requires the tape feed pitch of P in the Step S160, the determination in the Step S170 is made by determining whether a value produced by subtracting the distance P from the constant N has reached the leading cutoff length L (see FIG. 9(b)). Stated otherwise, the step S170 determines whether the tape cutoff execution position has spaced from the leading end of the printed area by the interval L, as shown in FIG. 7. The subsequent one character printing in the Step 160 and the determination in the Step 170 are repeatedly carried out until the top margin space having the length L can be obtained. In other words, the determination Step in S170 is performed at every one character printing. When the tape has moved *to provide* the interval L, it is cut off in Step S180 in the same manner as in the Step S130. After the tape has been cut off, it is printed in the Step S150. Specifically, when the confirm/execute key 13B is pressed, any remaining characters, other than those printed in the step S160, are printed on the tape, so that the characters as shown in FIG. 6 are completely printed.

After the characters have been printed, the tape feed roller 31 is rotated [for] *to provide* the interval T in step S190. Specifically, the tape is fed until the actual distance between a trailing end of the printed area and the tape cutoff execution position reaches the value T, as shown in FIG. 8. After the tape has been fed [for] *to provide* the interval T, [M] *T*, it is cut off in Step S200. Thereafter, the printing routine is brought to an end. The tape is cut off in the Step S200 in the same manner as in the Step S130. The thus cut label tape is then discharged as a piece of label tape, as shown in FIG. 6, from the tape printing device 1.

When the print key 13A is depressed after the tape has been cut off in the Step S200, the printing routine shown in FIG. 5 is initiated again to repeat the production of a label tape. When the confirm/execute key 13B is depressed, the CPU 41 waits for the entry of a key stroke. In the absence of the entry of any key stroke within a predetermined time period starting from the depression timing of the key 13B, the CPU 41 applies a signal to turn off the power supply to the ON/OFF switching circuit 53, whereupon the power supply is automatically turned off.

The tape printing device 1 as described above is capable of producing a label tape whose distance between the leading cutoff end and the leading end of the printed area is actually equal to the intended top marginal length L and whose distance between the trailing cutoff end and the trailing end of the printed area is actually equal to the intended rear or bottom marginal length T, as shown in FIG. 6. Such intended margin length can be simply provided by operating on the function key pad 13 to enter the leading cutoff length L and the trailing cutoff length T. As a consequence, when a tape is printed by the tape printing device, the tape printing device can produce a label tape of desired marginal dimensions which will not be subsequently required to be processed at the ends with scissors or the like.

The present invention should not be limited to the above described embodiment, but various changes and modifications may be made therein without departing from the spirit and scope of the present invention. For example, the tape printing device 1 may have a tape cutter which can be actuated by a motor or the like, for automatically cutting off the tape. The tape printing device 1 may also have a tape cutter for cutting off the tape such that the cutoff end has a certain curvature.

What is claimed is:

1. A tape printing device including a tape feed mechanism for feeding an elongated tape-like print medium in a tape feeding direction;

printing means for printing the tape-like print medium, the printing means providing a print start position;

tape cutting means positioned downstream of the printing means with respect to the feeding direction for cutting the tape-like print medium, the tape cutting means providing a predetermined tape cutoff execution position at which the tape-like print medium is subjected to cutting, the improvement comprising:

cutoff position data inputting means for inputting a cutoff position with respect to a position in which the tape-like print medium is printed; and tape feed controlling means for controlling the tape feed mechanism to feed the tape-like print medium based on the input cutoff position data so that the input cutoff position will reach the tape cutoff execution position.

2. The tape printing device as claimed in claim 1, wherein the cutoff position data comprises a first data indicative of a first distance between a leading cutoff end of the tape-like print medium and a leading end of a printed area, and a second data indicative of a second distance between a trailing cutoff end and a trailing end of the printed area.

3. The tape printing device as claimed in claim 2, wherein the cutoff position data inputting means comprises:

a CPU;

a character selector dial connected to the CPU for inputting the first and the second data into the CPU;

display means connected to the CPU for displaying the first and the second distances; and key pad connected to the CPU for providing the data inputting function.

4. The tape printing device as claimed in claim 3, wherein the display means comprises a liquid crystal display.

5. The tape printing device as claimed in claim 2, wherein the tape [feeding] *feed* mechanism comprises a pulse motor, and a tape feed roller connected to the pulse motor.

6. The tape printing device as claimed in claim 5, wherein the tape [feeding] *feed* mechanism further comprises an auxiliary roller confronting the tape feed roller and interposing the tape-like print medium between the tape feed roller and the auxiliary roller.

7. The tape printing device as claimed in claim 6, wherein the cutoff position data inputting means comprises:

a CPU;

a character selector dial connected to the CPU for inputting the first and the second data into the CPU;

display means connected to the CPU for displaying the first and the second distances; and a function key pad connected to the CPU for providing the data inputting function.

8. The tape printing device as claimed in claim 5, wherein the tape feed controlling means comprises [:] a motor driver circuit connected to the pulse motor.

9. The tape printing device as claimed in claim 8, wherein the tape feed controlling means further comprises:

a first judging means for judging whether the first distance is greater than a given distance between the print start position and the tape cutoff execution position; and controlling means for controlling the motor driver circuit in order to feed the tape-like print medium by a first length [corresponding] *necessary to provide* the first distance if the judgment in the first judging means [falls] *is* that the first distance is greater than the given distance.

10. The tape printing device as claimed in claim 9, wherein the tape feed controlling means further comprises:

means for driving the motor driver circuit so as to feed the tape-like print medium by the second distance after completing the printing.

11. The tape printing device as claimed in claim 10, wherein the tape [feeding] *feed* mechanism further comprises an auxiliary roller confronting the tape feed roller and interposing the tape-like print medium between the tape feed roller and the auxiliary roller.

12. The tape printing device as claimed in claim 11, wherein the cutoff position data inputting means comprises:

a CPU;

a character selector dial connected to the CPU for inputting the first and the second data into the CPU;

display means connected to the CPU for displaying the first and the second distances; and a function key pad connected to the CPU for providing the data inputting function.

13. The tape printing device as claimed in claim 8, wherein the tape feed controlling means further comprises:

a first judging means for judging whether the first distance is smaller than a given distance between the print start position and the tape cutoff execution position;

one character print commanding means for printing one character on the tape-like print medium if the judgment in the first judging means [falls] *is* that the first distance is smaller than the given distance, the one character printing providing a predetermined tape feed length;

a second judging means for judging whether [the] *a* subtraction of the predetermined tape feed length from the given distance reaches the first distance;

means for repeating operation of the one character print commanding means and the second judging means until the subtraction of the predetermined tape feed length from the given distance reaches the first distance.

14. The tape printing device as claimed in claim 13, wherein the tape feed controlling means further comprises[;]*:* means for driving the motor driver circuit so as to feed the tape-like printing medium by a distance which is subtraction of incremental predetermined tape feed length from the given distance.

15. The tape printing device as claimed in claim 14, wherein the tape [feeding] *feed* mechanism further comprises an auxiliary roller confronting the tape feed roller and interposing the tape-like print medium between the tape feed roller and the auxiliary roller.

16. The tape printing device as claimed in claim 15, wherein the cutoff position data inputting means comprises:

a CPU;

a character selector dial connected to the CPU for inputting the first and the second data into the CPU;

display means connected to the CPU for displaying the first and the second distances; and a function key pad connected to the CPU for providing the data inputting function.

17. The tape printing device as claimed in claim 9, wherein the tape feed controlling means further comprises[;]*:* one character print commanding means for printing one [?;] character on the tape-like print medium if the judgment in the first judging means [falls] *is* that the first distance is smaller than the given distance, the one character printing providing a predetermined tape feed length;

a second judging means for judging whether [the] *a* subtraction of the predetermined tape feed length from the given distance reaches the first distance;

means for repeating operation of the one character print commanding means and the second judging means until the subtraction of the predetermined tape feed length from the given distance reaches the first distance.

*18. The tape printing device as claimed in claim 2, wherein the tape feed mechanism comprises a motor, and a tape feed roller connected to the motor.*

*19. The tape printing device as claimed in claim 18, wherein the tape feed controlling means comprises a motor driver circuit connected to the motor.*

*20. The tape printing device as claimed in claim 19, wherein the tape feed controlling means further comprises:*

*a first judging means for judging whether the first distance is greater than a given distance between the print start position and the tape cutoff execution position; and*

*controlling means for controlling the motor driver circuit in order to feed the tape-like print medium by a first length necessary to provide the first distance if the judgment in the first judging means is that the first distance is greater than the given distance.*

*21. The tape printing device as claimed in claim 19, wherein the tape feed controlling means further comprises:*

*a first judging means for judging whether the first distance is smaller than a given distance between the print start position and the tape cutoff execution position;*

*one character print commanding means for printing one character on the tape-like print medium if the judgment in the first judging means is that the first distance is smaller than the given distance, the one character printing providing a predetermined tape feed length;*

*a second judging means for judging whether a subtraction of the predetermined tape feed length from the given distance reaches the first distance; and*

*means for repeating operation of the one character print commanding means and the second judging means until the subtraction of the predetermined tape feed length from the given distance reaches the first distance.*

*22. The tape printing device as claimed in claim 19, wherein the tape feed controlling means further comprises:*

*a first judging means for judging whether the first distance is smaller than a given distance between the print start position and the tape cutoff execution position; and*

*a second judging means for judging whether a subtraction of a predetermined tape feed length from the given distance reaches the first distance.*

*23. The tape printing device as claimed in claim 20, wherein the tape feed controlling means further comprises a second judging means, utilized if the judgment in the first judgment means is that the first distance is smaller than the given distance, for judging whether a subtraction of a predetermined tape feed length from the given distance reaches the first distance.*

*24. The tape printing device as claimed in claim 1, wherein the cutoff position data comprises at least one of a first data indicative of a first distance between a leading cutoff end of the tape-like print medium and leading end of a printed area, and a second data indicative of a second distance between a trailing cutoff end and a trailing end of the printed area.*

*25. A tape printing device including:*

*a tape feed mechanism for feeding an elongated tape-like print medium;*

*printing means for printing the tape-like print medium, the printing means providing a print start position;*

*tape cutting means positioned downstream of the printing means with respect to movement of the tape-like print medium for cutting the tape-like print medium, the tape cutting means providing a predetermined tape cutoff execution position at which the tape-like print medium is subjected to cutting;*

*cutoff position data inputting means for inputting a cutoff position with respect to a position in which the tape-like print medium is printed; and*

*tape feed controlling means for controlling the tape feed mechanism to feed the tape-like print medium so that the input cutoff position will reach the tape cutoff execution position.*

*26. A device for printing a tape, said device comprising:*

*a tape feed mechanism;*

*a print head disposed along said tape at a print start position;*

*a tape cutter positioned at a tape cutoff execution position that is a predetermined distance downstream of the print start position with respect to movement of the tape;*

*a CPU;*

*a data inputting mechanism connected to the CPU for inputting a cutoff position with respect to a position at which the tape is printed; and*

*circuitry that, along with the CPU, controls the tape feed mechanism to feed the tape so that the input cutoff position reaches the tape cutoff execution position.*

*27. A tape printing method comprising:*

*inputting at least one of a desired first marginal distance from a leading tape end and a desired second marginal distance from a trailing tape end to a tape printing device;*

*if the first marginal distance has been inputted, printing the tape starting at a position that is the first marginal distance from the leading tape end;*

*after printing is complete, and if the second marginal distance has been inputted, feeding the tape by a sufficient distance to provide said second marginal distance to said trailing tape end; and*

*cutting off the tape at said trailing tape end.*

*28. The tape printing method of claim 27, wherein an operator is prompted to input said at least one of said first and second terminal distances to a CPU of said tape printing device, the operator then inputting said at least one of said distances through a data inputting mechanism of said device.*

*29. The tape printing method of claim 27, further comprising:*

*judging whether the first marginal distance is greater or less than a given distance between a print start position and a tape cutoff execution position of a tape printing device; and*

*feeding the tape prior to printing by a first length necessary to provide the first marginal distance if the judgment is that the first marginal distance is greater than the given distance.*

*30. The tape printing method of claim 29, further comprising:*

*printing one character on the tape if the judgment is that the first marginal distance is smaller than the given distance, the one character printing providing a predetermined tape feed length;*

*judging whether a subtraction of the predetermined tape feed length from the given distance reaches the first marginal distance; and*

*repeating the steps of printing and judging one character at a time until reaching the first marginal distance.*

*31. The tape printing method of claim 27, wherein both said desired first marginal distance from a leading tape end and said desired second marginal distance from a trailing tape end are inputted to the tape printing device.*

* * * * *